United States Patent
Hur

(10) Patent No.: US 7,567,830 B2
(45) Date of Patent: Jul. 28, 2009

(54) ROTATING SLIDE-TYPE MOBILE COMMUNICATION TERMINAL

(75) Inventor: Sang-Hoon Hur, Youngdeungpo-gu (KR)

(73) Assignee: Pantech Co., Ltd., Seoul (KR)

( * ) Notice: Subject to any disclaimer, the term of this patent is extended or adjusted under 35 U.S.C. 154(b) by 530 days.

(21) Appl. No.: 11/389,895

(22) Filed: Mar. 27, 2006

(65) Prior Publication Data

US 2006/0223596 A1 Oct. 5, 2006

(30) Foreign Application Priority Data

Mar. 31, 2005 (KR) ...................... 10-2005-0026863

(51) Int. Cl.
*H04M 1/00* (2006.01)
(52) U.S. Cl. ................. 455/575.4; 455/575.1; 455/90.3
(58) Field of Classification Search ........................ None
See application file for complete search history.

(56) References Cited

U.S. PATENT DOCUMENTS 7,159,833 B2 * 1/2007 Kato ........................ 248/349.1
7,280,857 B2 * 10/2007 Geernaert ................. 455/575.4
2005/0107137 A1 * 5/2005 Byun et al. ............... 455/575.1
2005/0137000 A1 * 6/2005 Toh et al. .................. 455/575.4
2005/0221874 A1 * 10/2005 Cho et al. ................. 455/575.4

* cited by examiner

*Primary Examiner*—Erika A Gary
(74) *Attorney, Agent, or Firm*—H.C. Park & Associates, PLC

(57) ABSTRACT

Disclosed herein is a rotating slide-type mobile communication terminal. The rotating slide-type mobile communication terminal of the present invention includes a main body which includes a pair of guide rails having different curvatures and lengths formed at both sides in a central portion of the main body. The rotating slide-type mobile communication terminal further includes a slider which has on a front surface thereof a liquid crystal display to output various video signals, and a pair of coupling bosses on a rear surface thereof, so that, while the coupling bosses execute a sliding motion, the orientation of the slider is changed in a lateral direction of the main body. The rotating slide-type mobile communication terminal further includes a coupling means, which couples the bosses of the slider to the guide rails of the main body. Therefore, when the slider is opened, the orientation of the liquid crystal display of the slider is changed in a widescreen direction, thus allowing a user to effectively use various multimedia services, such as a TV, moving images and games.

17 Claims, 8 Drawing Sheets

ROTATING SLIDE-TYPE MOBILE COMMUNICATION TERMINAL

CROSS REFERENCE TO RELATED APPLICATION

This application claims priority from and the benefit of Korean Patent Application No. 10-2005-0026863, filed on Mar. 31,2005, which is hereby incorporated by reference for all purposes as if fully set forth herein.

BACKGROUND OF THE INVENTION

1. Field of the Invention

The present invention relates generally to mobile communication terminals and, more particularly, to a rotating slide-type mobile communication terminal in which a slider, having a liquid crystal display therein, rotatably slides on a main body and is thus opened in a lateral direction of the main body, thereby allowing a user to effectively use various multimedia service functions.

2. Description of the Related Art

Recently, according to rapid developments in the information and communication technologies industry, mobile communication terminals, such as cellular phones and personal digital assistants (PDA), have been expanded in function, for example, having not only functions of phones but also having functions of picture and moving image viewers, cameras, camcorders, digital diaries and electronic dictionaries.

Therefore, to output a larger amount of data at one time, scaling up of liquid crystal displays has been required, so that slide-type terminals which have liquid crystal displays larger than terminals of prior arts are gaining popularity.

A representative example of conventional slide-type communication terminals will be explained herein below.

FIG. 1 is an exploded perspective view showing the construction of a conventional slide-type mobile communication terminal.

As shown in FIG. 1, the conventional slide-type mobile communication terminal includes a main body 100 which has on a front surface thereof a keypad 111 to input various signals, such as letter and character data, and a microphone 112 to input audio signals. The conventional slide-type mobile communication terminal further includes a slider 200 which is coupled to the front surface of the main body 100 and is configured to slide in a direction parallel to the front surface of the main body 100. Both a liquid crystal display (not shown), which outputs a video signal, and a receiver (not shown), which outputs an audio signal, are provided on a front surface of the slider 200.

Therefore, a user is able to input signals using the keypad 111 after opening the front surface of the main body 100 such that the keypad 111 and the microphone 112 are exposed. In addition, in the above state, the user is able to perform telephonic communication with another person through the microphone 112 and a receiver (not shown).

The slider 200 has on a rear surface thereof a pair of guide rails 210, each of which guides a carrier 220 that is provided in each guide rail 210 of the slider 200. Coupling members 113 are provided on the main body 100 at predetermined positions corresponding to the carriers 220 placed in the guide rails 210, so that the coupling members 113 are coupled to the respective carriers 220 to form a structure such that the slider 200 slides relative to the main body 100 under the guidance of the guide rails 210 and the carriers 220.

However, in the conventional slide-type mobile communication terminal, the slider 200 has a structure in which it is linearly opened or closed, and the liquid crystal display is fixed in a longitudinal direction of the main body 100. Accordingly, it is somewhat inconvenient to use various multimedia services. In detail, even through software supports a wide-screen view, because the orientation of the liquid crystal display cannot be changed in a lateral direction of the main body 100, there is a structural disadvantage in that the user must rotate the entire terminal to view the liquid crystal display in a wide-screen fashion. Furthermore, the conventional slide-type mobile communication terminal is problematic in that, even if the user rotates the entire terminal, the orientation of the screen is not stably maintained.

SUMMARY OF THE INVENTION

Accordingly, the present invention has been made keeping in mind the above problems occurring in the prior art, and an object of the present invention is to provide a rotating slide-type mobile communication terminal which has an improved structure in which a slider is rotatably opened and closed, unlike conventional arts having linear opening and closing methods, so that, when the slider is opened, the slider is rotated at 90° on a main body, thus changing the orientation of a liquid crystal display provided in the slider in a lateral direction of the main body.

In order to accomplish the above object, the present invention provides a rotating slide-type mobile communication terminal, including: a main body, with a pair of guide rails having different curvatures and lengths formed at both sides in a central portion of the main body; a slider, with a liquid crystal display provided in a front surface of the slider to output various video signals, and a pair of coupling bosses provided on a rear surface of the slider so that, while the pair of coupling bosses slide along the pair of guide rails, orientation of the slider is changed in a lateral direction of the main body; and a coupling means for coupling the bosses of the slider to the guide rails of the main body.

The pair of guide rails may include: a first guide rail formed at a one-sided position based on a longitudinal central line of the main body and curved inwards from an upper end to a lower end; and a second guide rail formed at a position opposite the first guide rail and curved inwards from an upper end to a lower end. The second guide rail passes by the lower end of the first guide rail. The pair of coupling bosses may include: a first coupling boss configured to slide along the first guide rail; and a second coupling boss configured to slide along the second guide rail.

The lower ends of the first and second guide rails may be positioned along the same longitudinal axis of the main body, and the upper ends of the first and second guide rails may be positioned along the same lateral axis of the main body. The first and second coupling bosses may be disposed along the same longitudinal axis of the slider, so that, when the slider is closed on the main body, the first and second coupling bosses are placed in the respective lower ends of the first and second guide rails.

Furthermore, a distance between the lower ends of the first and second guide rails may be the same as a distance between the upper ends thereof.

The rotating slide-type mobile communication terminal may further include a coupling protrusion provided on the main body at a position adjacent to each of the pair of guide rails; and an elastic member coupled between each of the pair of coupling bosses and each of the coupling protrusions, so that the slider is semi-automatically opened and closed by the elastic members. Each of the elastic members may comprise a torsion spring, having at a first end thereof a first holding part fitted over each of the coupling bosses provided on the slider, and at a second end thereof a second holding part fitted over each of coupling protrusions provided at the positions adjacent to the guide rails of the main body.

The coupling means may comprise a rivet or a screw.

The rotating slide-type mobile communication terminal may further include a sliding support member provided among the pair of guide rails, the pair of coupling bosses and the coupling means, such that the coupling bosses slide smoothly along the respective guide rails.

The rotating slide-type mobile communication terminal may further include: a keypad provided on the front surface of the main body to input various signals, such as alphanumeric or character data; a game play button provided on the front surface of the main body; and a pair of stereo speakers provided in respective upper and lower ends of the slider.

The rotating slide-type mobile communication terminal may further include: a microphone provided at a medial position in a lower end of the main body to input audio signals; and a receiver provided at a predetermined position in the slider to output audio signals. Furthermore, the rotating slide-type mobile communication terminal may include: a microphone provided at a medial position in a lower end of the slider to input audio signals; and a receiver provided at a medial position in an upper end of the slider to output audio signals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings such that those skilled in the art can easily appreciate the present invention.

Figure 1:
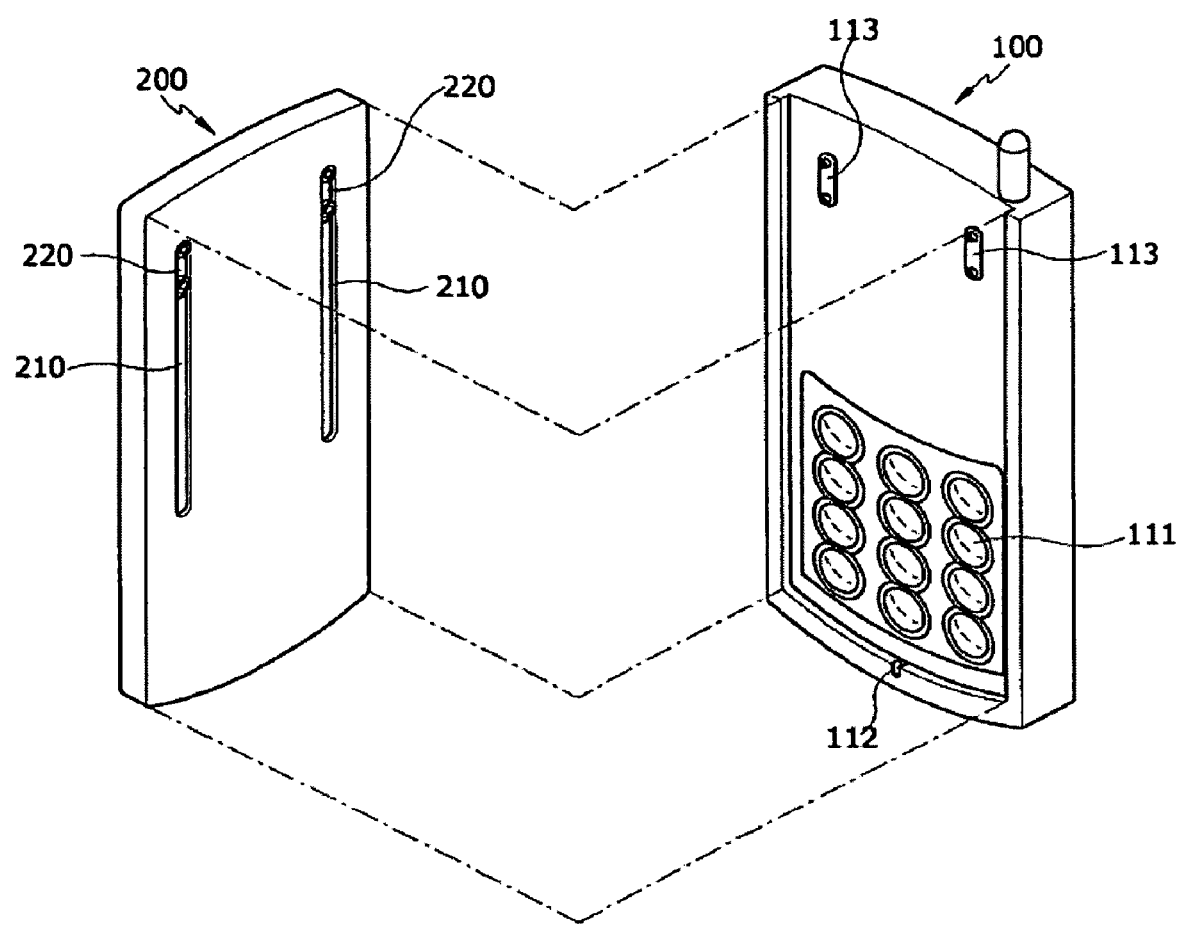
FIG. 1 is an exploded perspective view showing the construction of a conventional slide-type mobile communication terminal.
Figure 2:
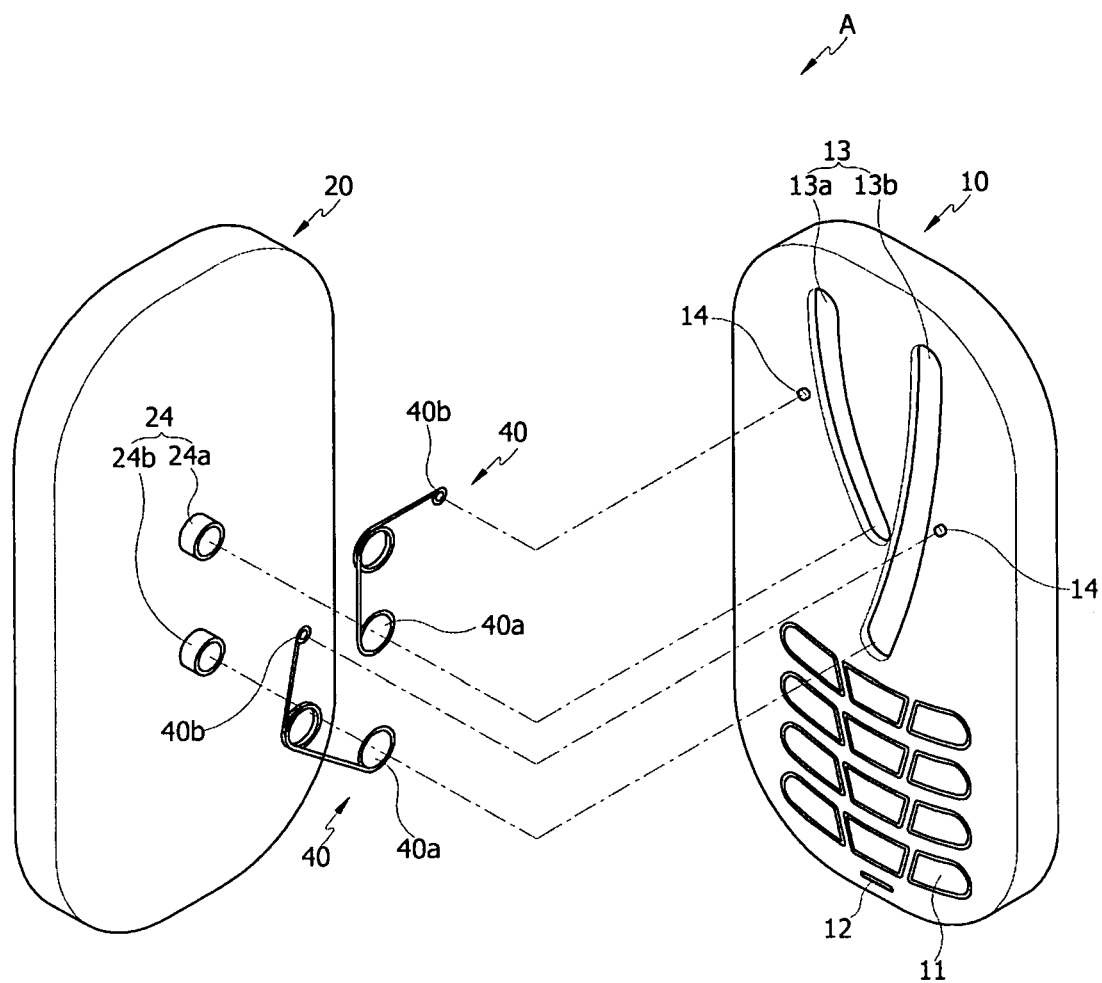
FIG. 2 is an exploded perspective view of a mobile communication terminal, according to an embodiment of the present invention.
Figure 3:
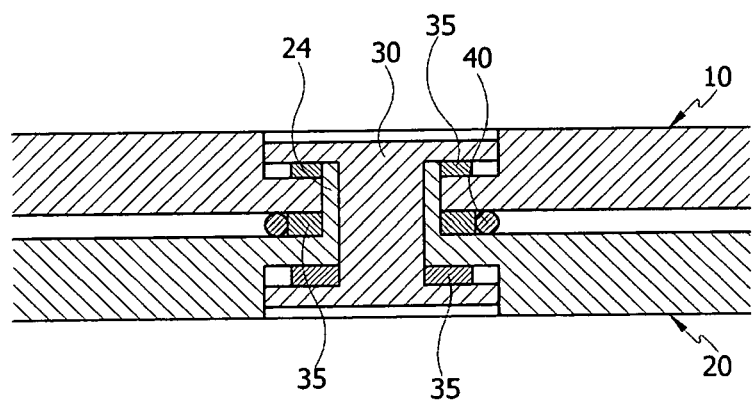
FIG. 3 is a sectional view showing a coupling structure of the mobile communication terminal of FIG. 2.

FIG. 2 is an exploded perspective view of a mobile communication terminal (A), according to the embodiment of the present invention. FIG. 3 is a sectional view showing a coupling structure of the mobile communication terminal (A) of FIG. 2.

As shown in FIGS. 2 and 3, the mobile communication terminal (A) according to the embodiment of the present invention includes a main body 10 in which a guide rail unit 13 is formed, and a slider 20 which has a coupling boss unit 24 that is coupled to the guide rail unit 13 such that, when the slider 20 slides relative to the main body 10, the orientation of the slider 20 is changed.

The main body 10 has a keypad 11 on a front surface thereof to input signals, such as various alphanumeric and character data, and a microphone 12 to input audio signals. A battery (not shown) is removably coupled to a rear surface of the main body 10 to supply power.

Furthermore, not shown in the drawings, a plurality of game play buttons may be provided in the main body 10, so that a user can play a game using the game play buttons through a liquid crystal display which is provided in the slider 20 and will be described later herein.

Meanwhile, the guide rail unit 13, which guides a sliding motion of the slider 20 that will be explained later herein, is provided in the main body 10. The guide rail unit 13 comprises a pair of guide rails which are formed at both sides in an upper part of the main body 10 above the keypad 11.

The guide rail unit 13 serves to convert the linear motion of the slider 20 into the rotating motion while the slider 20 executes the sliding motion, thus changing the orientation of the slider 20.

In detail, the guide rail unit 13 includes a first guide rail 13a, which is formed in the front surface of the main body 10, at a one-sided position based on a longitudinal central line of the main body 10, and having an elongated hole shape that is curved inwards from the upper end to the lower end. The guide rail unit 13 further includes a second guide rail 13b, which is formed in the front surface of the main body 10 at a position opposite the first guide rail 13a and has an elongated hole shape that is curved inwards from the upper end to the lower end and passes by the lower end of the first guide rail 13a. Thus, the first and second guide rails 13a and 13b approximately form a lower-case y shape.

The lower ends of the first and second guide rails 13a and 13b are disposed in the same longitudinal axis. The upper ends of the first and second guide rails 13a and 13b are disposed in the same lateral axis. Preferably, the distance between the lower ends of the first and second guide rails 13a and 13b is the same as the distance between their upper ends.

The slider 20 overlaps the main body 10 and is coupled to the front surface of the main body 10 such that the slider 20 is able to execute a sliding motion on the front surface of the main body 10. The liquid crystal display 21, which outputs various video signals, and a receiver 22, which outputs audio signals, are provided in the front surface of the slider 20.

Here, when the slider 20 is completely opened, the liquid crystal display 21 is changed into a widescreen type, in which a ratio of the width to the height of the liquid crystal display 21 is 16:9. The receiver 22, which outputs audio signals, is provided at a medial position of one side of the front surface of the slider 20.

That is, because the slider 20 has a structure such that it is rotated on the main body 10 while being opened, the receiver 22 must be provided at a medial position of one side of the slider 20. As well, when the slider 20 is completely opened, the receiver 22 enters the same axis as the microphone 12, thus allowing the user to conduct telephonic conversation with another person.

Not shown in the drawings, a separate microphone and receiver, which allow the user to conduct telephonic conversation with another person, may be respectively provided at medial positions of lower and upper ends of the slider 20. In this case, even when the slider 20 is in a state of being closed, the user is able to conduct telephonic conversation.

Furthermore, a pair of stereo speakers 25 and 25' are provided in the upper and lower ends of the slider 20. In other words, the stereo speakers 25 and 25', having an identical shape and size, are provided in the upper and lower ends of the slider 20, so that, when the slider 20 is in the state of being opened, an audio signal is output as stereophonic sound. Thus, the user can use various multimedia services while experiencing stereophonic sound.

Meanwhile, the coupling boss unit 24 is provided on a rear surface of the slider 20 at a position corresponding to the guide rail unit 13 of the main body 10 when the slider 20 is assembled with the main body 10.

The coupling boss unit 24 includes a first coupling boss 24a, which has a hollow cylindrical shape and is coupled to the first guide rail 13a constituting the guide rail unit 13, and a second coupling boss 24b, which is coupled to the second guide rail 13b. The first and second coupling bosses 24a and 24b are disposed along the same longitudinal axis on the rear surface of the slider 20. Furthermore, when the slider 20 is assembled with the main body 10, the first and second coupling bosses 24a and 24b are respectively placed in the lower ends of the first and second guide rails 13a and 13b.

In the drawings, the coupling boss unit 24 is integrated with the rear surface of the slider 20, but the present invention is not limited to this. For example, for ease of production or assembly of the slider 20, the slider 20 may be constructed such that a separate member, having a coupling boss unit 24, is mounted to the rear surface of the slider 20.

The main body 10 and the slider 20, which have the above-mentioned structures, are assembled with each other by a coupling means 30 into a structure such that the slider 20 is slidable relative to the main body 10.

In detail, as shown in FIG. 2, the guide rail unit 13 is formed in an elongated hole shape in the front surface of the main body 10, and the coupling boss unit 24 has a hollow cylindrical shape. The coupling boss unit 24 is placed in and coupled to the guide rail unit 13 using the coupling means 30 having various shapes, for example, a rivet or screw. Thus, the slider 20 is reliably assembled with the main body 10 and is able to execute the sliding motion on the main body 10.

Furthermore, sliding support members 35 that diminish friction may be interposed among the guide rail unit 13, the coupling boss unit 24 and the coupling means 30, thus ensuring a smooth sliding motion of the coupling boss unit 24.

The operation of the guide rail unit 13 and the coupling boss unit 24 of the mobile communication terminal (A) of the present invention will be explained herein below.

Figure 4A:
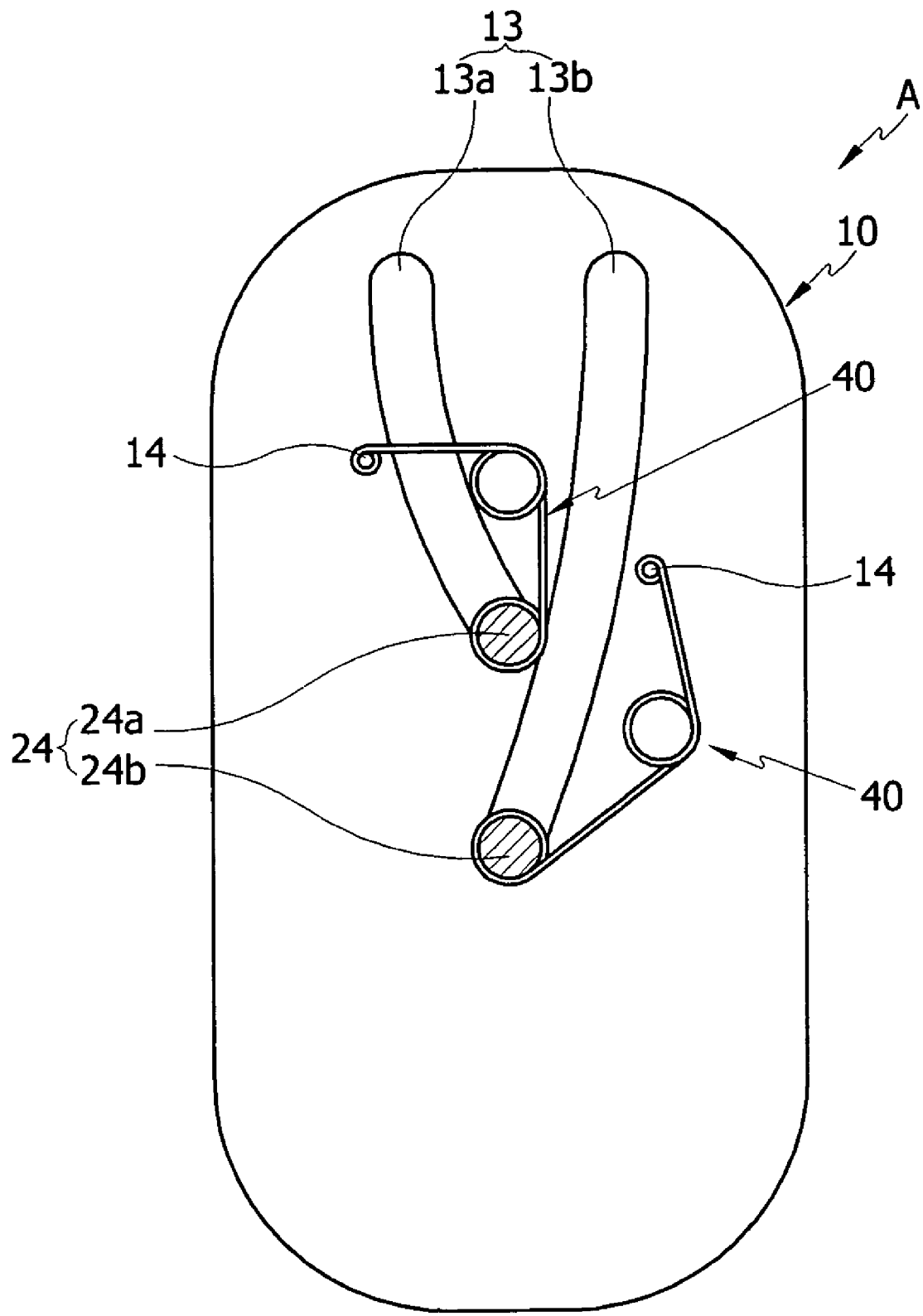
FIGS. 4a through 4c are plan views showing the operation of guide rails and coupling bosses of the mobile communication terminal according to the embodiment of the present invention.
Figure 4B:
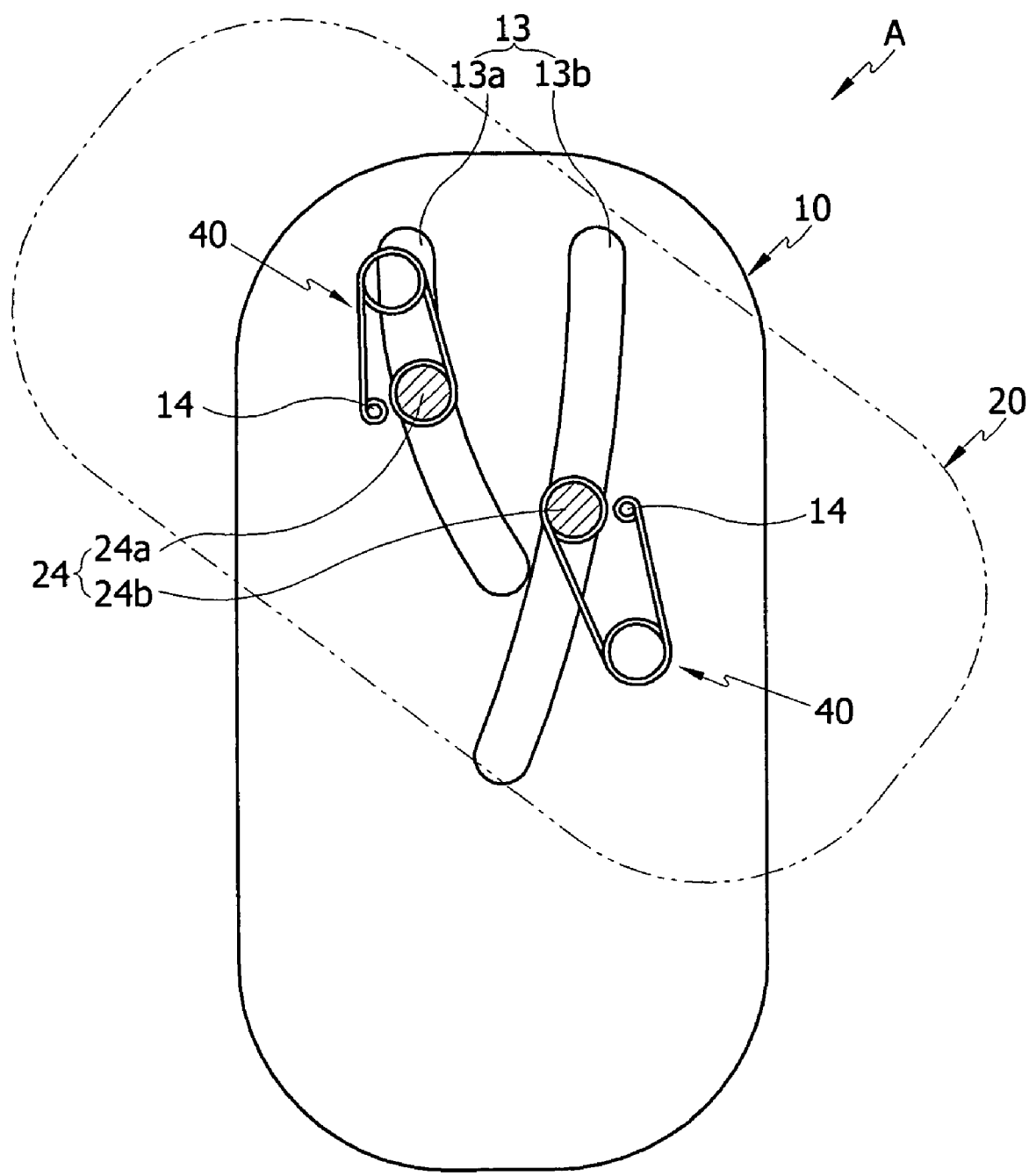
Figure 4C:
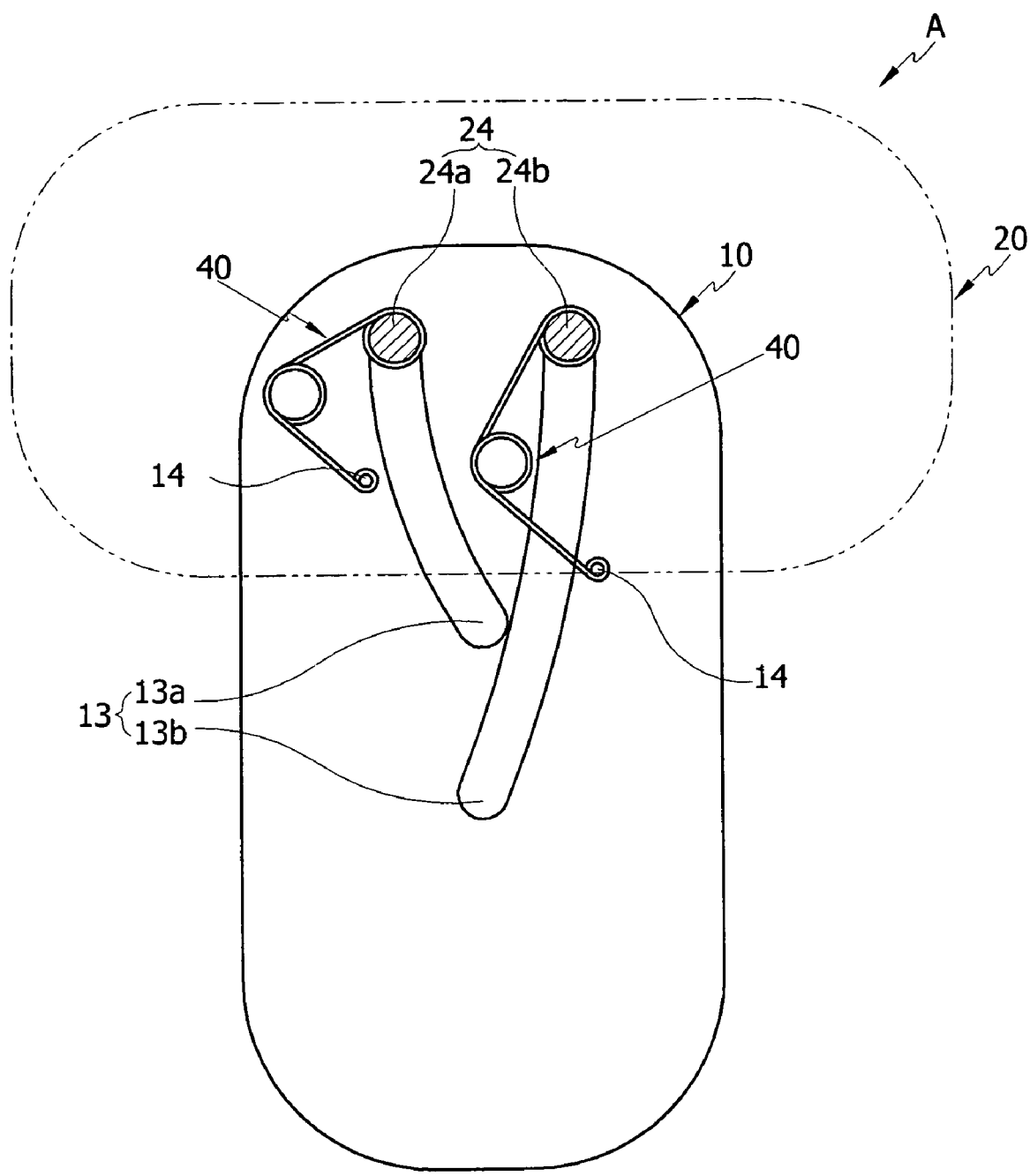
Figure 5A:
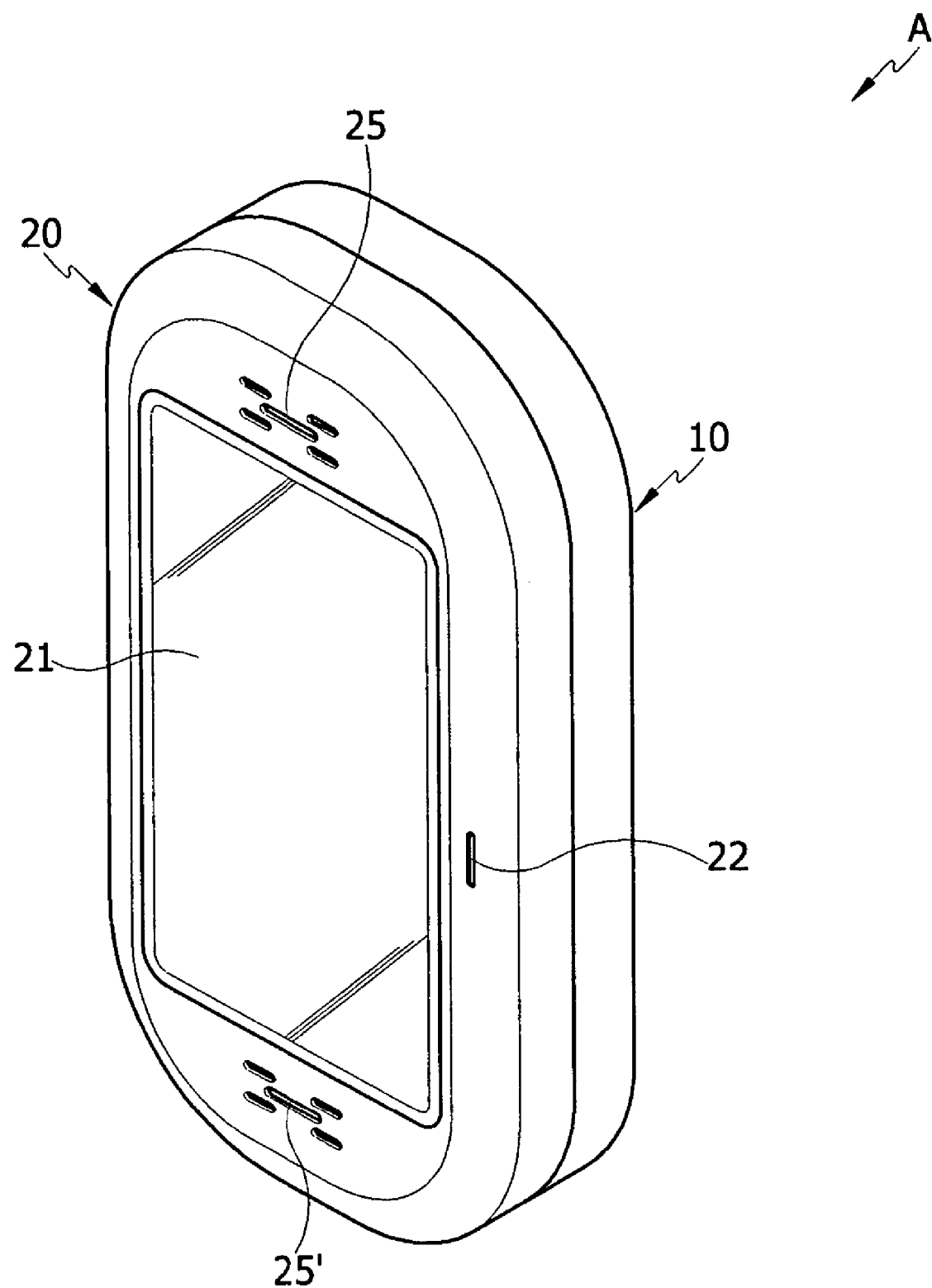
FIGS. 5a through 5c are perspective views showing opening operation of the mobile communication terminal according to the embodiment of the present invention.
Figure 5B:
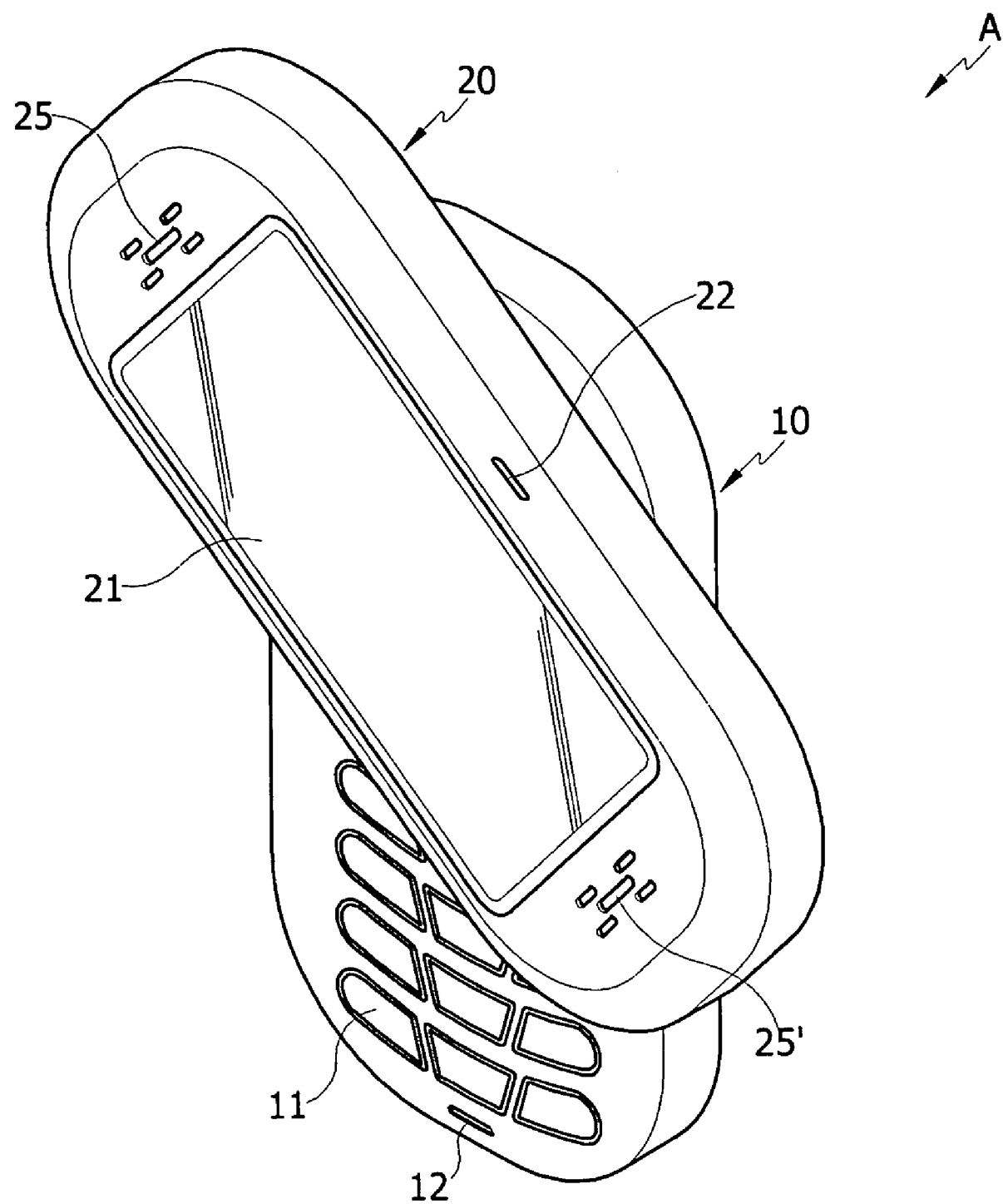
Figure 5C:
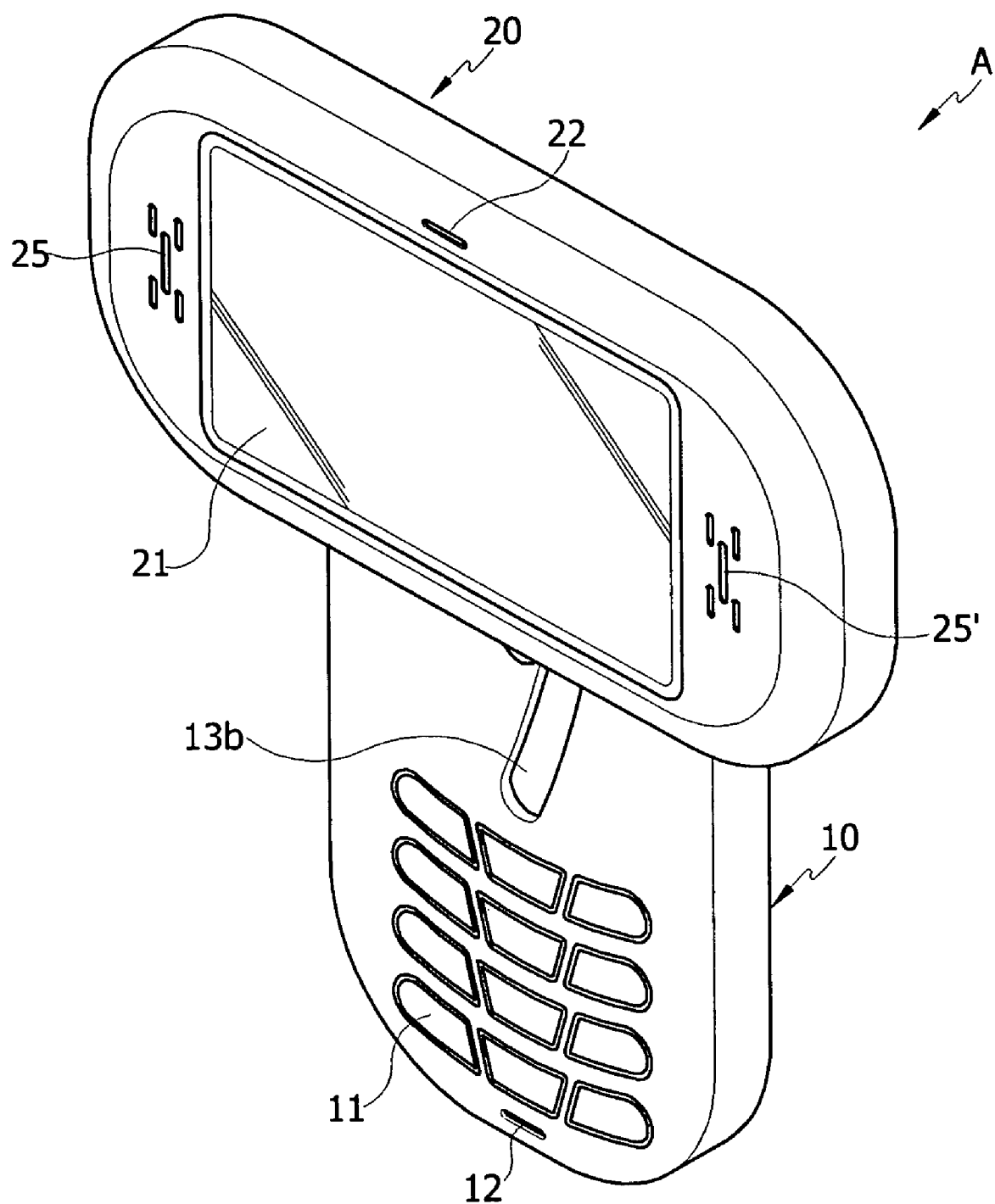

FIGS. 4a through 4c are plan views showing the operation of the guide rail unit 13 and the coupling boss unit 24 of the mobile communication terminal (A) according to the present invention. FIGS. 5a through 5c are perspective views showing opening operation of the mobile communication terminal (A).

As shown in the drawings, in the mobile communication terminal (A) of the present invention, the orientation of the slider 20 is changed while the first and second coupling bosses 24a and 24b are moved along the first and second guide rails 13a and 13b formed in the front surface of the main body 10.

In detail, as shown in FIGS. 4a and 5a, in a state in which the slider 20 completely overlaps the main body 10 and is thus closed on the main body 10, the first and second coupling bosses 24a and 24b are respectively positioned at the lower ends of the first and second guide rails 13a and 13b which are disposed along the same longitudinal axis.

From this state, when an opening motion of the slider 20 starts, the first and second coupling bosses 24a and 24b provided on the rear surface of the slider 20 move away from the lower ends of the first and second guide rails 13a and 13b while rotating. Continuously, the first and second coupling bosses 24a and 24b enter the state of FIGS. 4c and 5c via the state of FIGS. 4b and 5b, thus changing the orientation of the slider 20. That is, because the first and second guide rails 13a and 13b have different curved shapes, while the first and second coupling bosses 24a and 24b execute curvilinear motion but not linear motion, the slider 20 is rotated. As such, when the slider 20 is rotated and completely opened, because the first and second coupling bosses 24a and 24b are positioned at the upper ends of the first and second guide rails 13a and 13b which are disposed along the same lateral axis, the orientation of the slider 20 is changed by 90°-from a longitudinal direction of the main body 10 to a lateral direction.

In this state, the liquid crystal display 21, which is provided in the front surface of the slider 20, is also rotated by 90° and oriented in a lateral direction of the main body 10, thus being changed into a widescreen type. Simultaneously, the stereo speakers 25 and 25' which are provided in the opposite ends of the slider 20 are also changed in location. Therefore, the user is able to use various multimedia services, such as games, moving images and movies, while experiencing a widescreen view and stereophonic sound.

Meanwhile, the mobile communication terminal (A) of the present invention may be constructed such that the slider 20 is semi-automatically opened and closed.

To achieve the above-mentioned purpose, in the mobile communication terminal (A) of the present invention, elastic members 40, which provide elastic force for the slider 20 when executing a sliding motion, are provided between the main body 10 and the slider 20.

As shown in FIG. 2, each elastic member 40 has a torsion spring shape, which is formed by bending a single steel wire. Each elastic member 40 includes at a first end thereof a first holding part 40a which is fitted over each of the first and second coupling bosses 24a and 24b, and at a second end thereof a second holding part 40b which is fitted over each of coupling protrusions 14 that are provided at predetermined positions on the main body 10.

The elastic force of each elastic member 40 is changed depending on the location of the associated coupling protrusion 14 provided on the main body. It is preferable that each coupling protrusion 14 be disposed at a position adjacent to an intermediate portion of the associate guide rail 13a or 13b.

As such, the first holding parts 40a of the elastic members 40 are respectively fitted over the first and second coupling bosses 24a and 24b, and each of the second holding parts 40b is fitted over each coupling protrusion 14. When the slider 20 is partially opened, because the coupling protrusions 14 which are inserted into the second holding parts 40b of the elastic members 40 are stationary, and the first and second coupling bosses 24a and 24b which are inserted into the first holding parts 40a are being moved, the elastic members 40 are compressed by movement of the first and second coupling bosses 24a and 24b and, simultaneously, apply elastic force to the first and second coupling bosses 24a and 24b. Therefore, in the above state, if the slider 20 is released, the slider 20 is automatically opened or closed by the elastic force of the elastic members 40.

Furthermore, the elastic members 40 serve to support the main body 10 and the slider 20 in the opened state of the slider 20 as well as in the closed state thereof, thus ensuring the stability of the mobile communication terminal (A) without being undesirably moved.

As described above, the present invention provides a mobile communication terminal which has a structure such that, when a slider is opened, the orientation of a liquid crystal display provided in the slider is changed in a widescreen direction, thus allowing a user to effectively use various multimedia services, such as a TV, moving images and games.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A rotating slide-type mobile communication terminal, comprising:
   a main body, comprising a pair of curved guide rails, the pair of curved guide rails comprising a first guide rail and a second guide rail having different curvatures and lengths from each other and being arranged at both sides in a central portion of the main body;
   a slider comprising a liquid crystal display provided in a front surface of the slider to output a video signal, and a pair of coupling bosses provided on a rear surface of the slider so that, if the pair of coupling bosses slide along the pair of curved guide rails, orientation of the slider is changed in a lateral direction of the main body; and
   a first coupling member to couple one of the pair of coupling bosses of the slider to the first guide rail of the main body.

2. The rotating slide-type mobile communication terminal as set forth in claim 1, wherein
   the first guide rail is arranged at a first side position based on a longitudinal central line of the main body and curved inwards from an upper end to a lower end of the first guide rail; and the second guide rail is arranged at a second side position opposite the first side position about the longitudinal central line the second guide rail being curved inwards from an upper end to a lower end of the second guide rail and extending lower than the first guide rail, and
   the pair of coupling bosses comprises: a first coupling boss configured to slide along the first guide rail; and a second coupling boss configured to slide along the second guide rail.

3. The rotating slide-type mobile communication terminal as set forth in claim 2, wherein the lower ends of the first and second guide rails are positioned along a same longitudinal axis of the main body, and the upper ends of the first and second guide rails are positioned along a same lateral axis of the main body, and
   the first and second coupling bosses are disposed along a same longitudinal axis of the slider, so that, if the slider is closed on the main body, the first and second coupling bosses are placed in the respective lower ends of the first and second guide rails.

4. The rotating slide-type mobile communication terminal as set forth in claim 2 or 3, wherein a distance between the lower ends of the first and second guide rails is the same as a distance between the upper ends thereof.

5. The rotating slide-type mobile communication terminal as set forth in claim 1, further comprising:
   a first coupling protrusion provided on the main body at a position adjacent to the first guide rail; and
   a first elastic member coupled between a first coupling boss and the first coupling protrusion, so that the slider is semi-automatically opened and closed by the elastic member.

6. The rotating slide-type mobile communication terminal as set forth in claim 5, wherein the first elastic member comprises a torsion spring, the torsion spring having at a first end thereof a first holding part fitted over the first coupling boss provided on the slider, and at a second end thereof a second holding part fitted over the first coupling protrusions.

7. The rotating slide-type mobile communication terminal as set forth in claim 5, further comprising:
   a second coupling protrusion provided on the main body at a position adjacent to the second guide rail; and
   a second elastic member coupled between a second coupling boss and the second coupling protrusion.

8. The rotating slide-type mobile communication terminal as set forth in claim 7, wherein the second elastic member comprises a torsion spring, the torsion spring comprising a first holding part fitted over the second coupling boss on the slider, and a second holding part fitted over the second coupling protrusion.

9. The rotating slide-type mobile communication terminal as set forth in claim 1, wherein the first couple member comprising a rivet.

10. The rotating slide-type mobile communication terminal as set forth in claim 1, wherein the first coupling member comprising a screw.

11. The rotating slide-type mobile communication terminal as set forth in claim 1, further comprising:
    a sliding support member provided among the pair of curved guide rails, the pair of coupling bosses and the first coupling member, such that the coupling bosses slide smoothly along the respective curved rails.

12. The rotating slide-type mobile communication terminal as set forth in claim 1, further comprising:
    a keypad provided on a front surface of the main body, the keypad comprising keys to receive alphanumeric or character data.

13. The rotating slide-type mobile communication terminal as set forth in claim 1, further comprising: a game play button provided on a front surface of the main body.

14. The rotating slide-type mobile communication terminal as set forth in claim 1, further comprising:
    a pair of speakers provided in respective upper and lower ends of the slider.

15. The rotating slide-type mobile communication terminal as set forth in claim 1, further comprising:
    a microphone provided at a medial position in a lower end of the main body to input audio signals; and
    a receiver provided at a predetermined position in the slider to output audio signals.

16. The rotating slide-type mobile communication terminal as set forth in claim 1, further comprising:
    a microphone provided at a medial position in a lower end of the slider to input audio signals; and
    a receiver provided at a medial position in an upper end of the slider to output audio signals.

17. The rotating slide-type mobile communication terminal as set forth in claim 1, further comprising:
    a second coupling member to couple the other of the pair of coupling bosses to the second rail.

* * * * *